United States Patent [19]
Nakano et al.

[11] Patent Number: 5,643,998
[45] Date of Patent: Jul. 1, 1997

[54] RECYCLABLE POLYMER, PROCESS FOR PRODUCING THE SAME, METHOD FOR RECOVERING THE SAME, AND METHOD FOR REGENERATING THE SAME

[75] Inventors: Mitsuru Nakano; Arimitsu Usuki; Akane Okada; Osami Kamigaito, all of Aichi, Japan

[73] Assignee: Kabushiki Kaisha Toyota Chuo Kenkyusho, Aichi-ken, Japan

[21] Appl. No.: 400,869

[22] Filed: Mar. 8, 1995

[30] Foreign Application Priority Data

Mar. 10, 1994 [JP] Japan ................. 6-067854

[51] Int. Cl.$^6$ ................. C08G 77/00
[52] U.S. Cl. ............ 525/103; 525/104; 525/105; 525/285; 525/314; 525/523; 525/528; 525/422; 525/316; 528/125; 528/350; 528/376
[58] Field of Search ............ 525/103, 104, 525/105, 285, 314, 523, 528, 422, 316; 528/376, 125, 350

[56] References Cited

U.S. PATENT DOCUMENTS

| | | | |
|---|---|---|---|
| 4,882,399 | 11/1989 | Tesoro et al. | 525/523 |
| 5,194,501 | 3/1993 | Babu | 525/103 |
| 5,260,411 | 11/1993 | Tesoro et al. | 528/353 |
| 5,369,175 | 11/1994 | Hoximeier | 525/99 |

FOREIGN PATENT DOCUMENTS

| | | |
|---|---|---|
| 0314256 | 5/1989 | European Pat. Off. . |
| 0464408 | 1/1992 | European Pat. Off. . |

OTHER PUBLICATIONS

"Thermoplastic Compression Molded Horizontal Automotive Panels," SAE Technical Paper Series No. 920377, pp. 79–96 (1992).

"Chemical Approach to Recycling Mixed Plastics from Shredder Fluff" Preprint from the 6th Annual Recyclingplas Conference, pp. 38–46(1991).

"Automobile Shredder Residue: Treatment Options" Hazardous Waste & Hazardous Materials, vol. 8, No. 3, pp. 219–230 (1991).

"Synthesis of Copolyamide–Esters and Some Aspects Involved in Their Hydrosis by Lipase," Journal of Applied Polymer Science, vol. 24, pp. 1701–1711 (1979).

"Hydrosis of Copolyesters Containing Aromatic and Aliphatic Ester Blocks by Lipase," Journal of Applied Polymer Science, vol. 26, pp. 441–448 (1981).

*Primary Examiner*—Irina S. Zemel
*Attorney, Agent, or Firm*—Oblon, Spivak, McClelland, Maier & Neustadt, P.C.

[57] ABSTRACT

A recyclable polymer is formed of a plurality of oligomer units obtained by polymerizing a fixed number of monomers, and linkage units for linking the oligomer units through a chemical bond which is different from a bond between monomers constituting the oligomer units, thereby allowing repetitive scission and re-bonding of the linkage units by a predetermined treatment not cleaving the bond between monomers. The recyclable polymer is decomposable into oligomers and the oligomers can be linked again into the original polymer without degrading the quality of the polymer. A process for producing the recyclable polymer, a method for recovering the recyclable polymer, and a method for regenerating the recyclable polymer are also provided.

37 Claims, 6 Drawing Sheets

FIG. 4
X—Y + nM ⟶ X—Mn—Y
FIG. 5
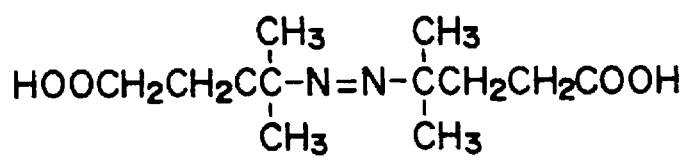
FIG. 6
HOOCH₂CS—SCH₂COOH
FIG. 7
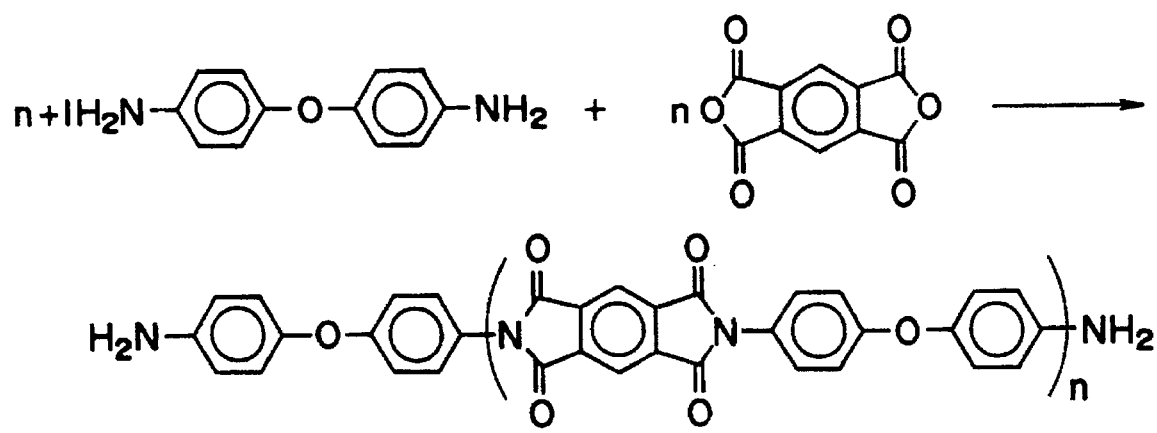

RECYCLABLE POLYMER, PROCESS FOR PRODUCING THE SAME, METHOD FOR RECOVERING THE SAME, AND METHOD FOR REGENERATING THE SAME

BACKGROUND OF THE INVENTION

1. Field of the Invention

This invention relates to a recyclable polymer which is an advantageous and significant novel material for recycling, a process for producing the same, a method for recovering the same, and a method for regenerating the same. More specifically, this invention is to provide an approach to cope with the disposal of polymeric waste such as shredder residues of scrapped cars.

2. Description of the Related Arts

In recent years, considering the limited resources such as petroleum for use as raw materials and the problem of disposal of wastes, recycling of polymeric materials such as shredder residues of cars and the like have aroused our interest. However, the recycling of polymeric materials has posed problems such as the following:

(1) The mixture of various kinds of polymeric materials contained in waste is difficult to fractionate and recover.

(2) The properties of the polymeric materials deteriorate when they are reused.

With respect to the above problem (1), there are two techniques that may be used, namely one in which commingled materials are fractionated based on their solubility in a solvent as disclosed in, e.g., "Chemical Approach to Recycling Mixed Plastics from Shredder Fluff", B. J. Jody, E. J. Daniels, and P. V. Bonsignore in Plast. Recycl. Future Bus. Oppor. 38–46 (1991), and another which involves fractionation based on differences in specific gravity.

Next, with respect to the above problem (2), there is a technique by which a waste of polymeric materials is decomposed into monomers which are then polymerized again to revive their qualities, as disclosed in, e.g., "Thermoplastic Compression Molded Horizontal Automotive Panels", M. D. Drigotas, G. P. Weeks, and J. M. Fisher in SAE Tech. Pap. Ser. (1992).

However, it is hard to fractionate thermosetting resins having poor solubility or resins having close specific gravities using the above-mentioned fractionation techniques. Meanwhile, in the technique of reviving the qualities, the kinds of the polymeric materials that can be decomposed into monomers are limited. Moreover, the polymerization after decomposition to monomers involves a great loss of energy, which is economically disadvantageous.

SUMMARY OF THE INVENTION

Accordingly, it is an object of the present invention to provide a novel polymer which is advantageous and significant for recycling, a process for producing the same, a method for recovering the same and a method for regenerating the same.

The present inventors have contrived a polymer in which oligomers of a specific molecular weight are linked with each other via a linkage unit, so that the polymer is decomposable into oligomers and these oligomers can be linked with each other again via the linkage unit to reconstitute the original polymer.

To form a polymer which is advantageous and significant for recycling, the linkage unit is required to have the following conditions.

(1) The bonding of a linkage unit is a chemical bond which is different from the bonding between monomers, and allows scission and re-bonding by such a predetermined treatment capable of scissoring only the chemical bond in the linkage units.

(2) The presence of a linkage unit does not substantially impair the inherent properties of the polymer.

If a polymer is constituted in the above-mentioned manner, it is easy to decompose the polymer into oligomers and to fractionate and recover the oligomer from the waste containing different kinds of polymeric materials by a variety of means using a difference in molecular weight between the polymer and other polymeric materials. Besides, it is also possible to exclude deteriorated oligomers from those to be recovered so that a certain level of quality of the regenerated product is secured. The oligomers may be then formed again into the original polymer.

The above and other objects, features and advantages of this invention will become more apparent from the following description when taken in conjunction with the accompanying drawings in which the preferred embodiments of the invention are shown by way of illustrative examples.

BRIEF DESCRIPTION OF THE DRAWINGS

FIG. 4 is a scheme showing telomerization.

FIG. 5 is a chemical formula of 4,4-azobis-4-cyanovaleric acid.

FIG. 6 is a chemical formula of dithioglycolic acid.

FIG. 7 is a scheme showing an example of how a polyimide-type oligomer unit is formed.

DETAILED DESCRIPTION

Figure 1:
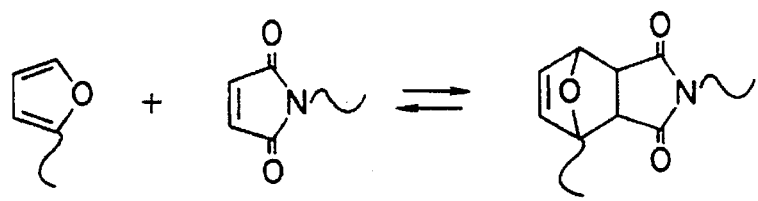
FIG. 1 is a scheme showing an example of the formation of a linkage unit.

The first aspect of the present invention resides in a recyclable polymer comprising a plurality of oligomer units formed of a fixed number of monomers, and linkage units for linking the oligomer units through a chemical bond which is different from a bond between the monomers constituting the oligomer units, thereby allowing repetitive scission and re-bonding of the linkage units by a predetermined treatment capable of scissoring only the chemical bond in the linkage units.

Since the recyclable polymer in the first aspect of the invention has a linkage unit that links the oligomer units through a particular chemical bond that allows repetitive scission and re-bonding through the predetermined treatment capable of scissoring only the chemical bond in the linkage units, this particular chemical bond alone can selectively be scissored or re-bonded. In recycling the used recyclable polymer, the polymer can be recovered and regenerated by a method of a third or fourth aspect of the present invention, making it possible to eliminate the problems in fractionation, recovery and reuse through the conventional techniques.

The kind of the oligomer in the oligomer unit is not particularly limited. Examples of the oligomer include oligomers of polyolefins such as polypropylene, polyethylene and polystyrene; oligomers of elastomers such as polybutadiene and polyisoprene; and oligomers of polymers such as polymethyl methacrylate, polyamide, polyurethane, polycarbonate and polyester.

Oligomers as constituents of thermosetting resins such as an alkyd resin, an epoxy resin or an unsaturated polyester resin may also serve as the oligomer unit. Usually, it is difficult to recycle a waste product of a thermosetting resin, because the thermosetting resin is cured by cross-linking and it does not melt by heating. However, a recyclable thermosetting resin according to the present invention can be oligomerized even after it is cured by cross-linking to form low-molecular oligomers having a uniform molecular weight. As a result, such a waste product can be recycled (see Example 5).

An oligomer unit composed of a copolymer obtained by copolymerizing two or more kinds of monomers can also be used.

Generally, when the molecular weight of an oligomer unit or the degree of polymerization of the monomer in the oligomer unit is too low, the proportion in weight of linkage units is relatively high. For this reason, it is likely that properties inherent in the polymer change or that the physical properties of the polymer deteriorate. Furthermore, when the molecular weight of the oligomer unit or the degree of polymerization of the monomer is too high, the solubility and the fluidity of the oligomer obtained in an oligomerization step when recovering the recyclable polymer decrease; then it is likely that an intended oligomer can hardly be fractionated or recovered from commingled waste that contains polymeric materials.

Regarding the oligomer unit, since the upper and lower limits of its molecular weight and the degree of polymerization of the monomers are actually settled according to the kinds of the monomers so far as they meet a purpose of a polymer suitable for recycling, it is difficult to restrict them generally. A dimer, or an oligomer having a low molecular weight of less than 500, and an oligomer made of tens of monomers, or an oligomer having a high molecular weight of approximately 10,000 or more may effectively constitute the oligomer unit.

The linkage unit has to link the oligomer units through a chemical bond that repetitively allows scission and re-bonding by such a predetermined treatment capable of scissoring only the chemical bond in the linkage units.

An example of the linkage unit is a —Si—Si— bond. This linkage unit can be introduced by using, for example, a compound having a monochlorsilyl group (—Si—Cl) as a compound for constituting the linkage unit. The —Si—Si— bond can be scissored by irradiation with deep UV light (254 nm) and be re-bonded by coupling.

Another example of the linkage unit is a —C(=O)—O— (ester) bond. This linkage unit can be introduced using, for example, a compound having a carboxyl group and a compound having a hydroxyl group as compounds for constituting the linkage unit. This ester bond can be scissored by hydrolysis and re-bonded by dehydrocondensation. It is advisable to avoid constructing the linkage unit by using polyurethane, polyamide, polycarbonate and polyester, which have an easily hydrolyzable bonding between the monomers.

Still another example of the linkage unit is a —S—S— (disulfide) bond. This linkage unit can be introduced using a compound having a mercapto group as a compound for constituting the linkage unit. The disulfide bond can be scissored by oxidation and re-bonded by reduction.

Yet another example of the linkage unit is a linkage unit composed of a furan ring and a maleimide ring as precursors. This linkage unit can be scissored or re-bonded through Diels-Alder and retro-Diels-Alder reactions as shown in FIG. 1 by linking one monomer or oligomer to a furyl group and another monomer or oligomer with a maleimide group. An S-shaped bond in FIG. 1 shows a bond with an oligomer and may be bonded to the oligomer via an alkylene group or the like.

Figure 2:
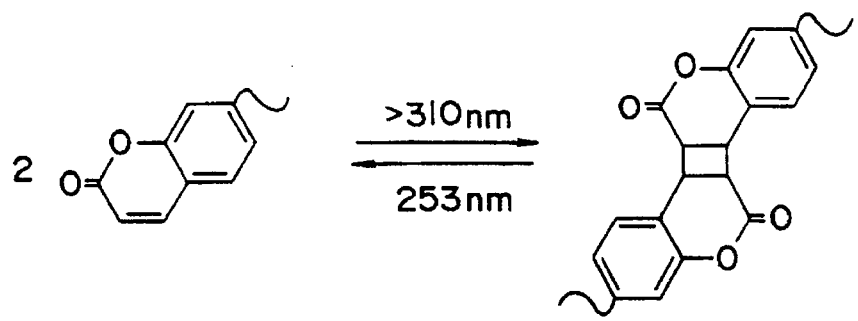
FIG. 2 is a scheme showing another example of the formation of the linkage unit.

The other example of the linkage unit is a linkage unit using coumarin or anthracene as a precursor. Coumarin or anthracene as a precursor is bonded to a pair of monomers or oligomers and subjected to photodimerization by irradiation of near UV light as shown in FIG. 2 to complete the linkage unit. The S-shaped bond in FIG. 2 has the same function as the S-shaped bond in FIG. 1.

The recyclable polymer having a linkage unit in which coumarin or anthracene is used as a precursor may be oligomerized by causing a reaction opposite to the above photodimerization upon changing the wavelength of the radiation.

The recyclable polymer can take any structure: it could be not only a linear polymer having a linear chain structure, but also a comb-shaped polymer having a structure such that a main chain has side chains at regular intervals, a so-called star polymer, a branched polymer having a structure such that a polymer chain has a random number of branches, and a cross-linked polymer which is cross-linked such that the polymer chains constitute a three-dimensional network. In the above polymers having the various structures, the branched point or the cross-linked point of the polymer chains may be formed at the linkage unit, and the monomers for constituting the oligomer unit may form the branched portion or the cross-linked portion by using its side chain.

Figure 3:
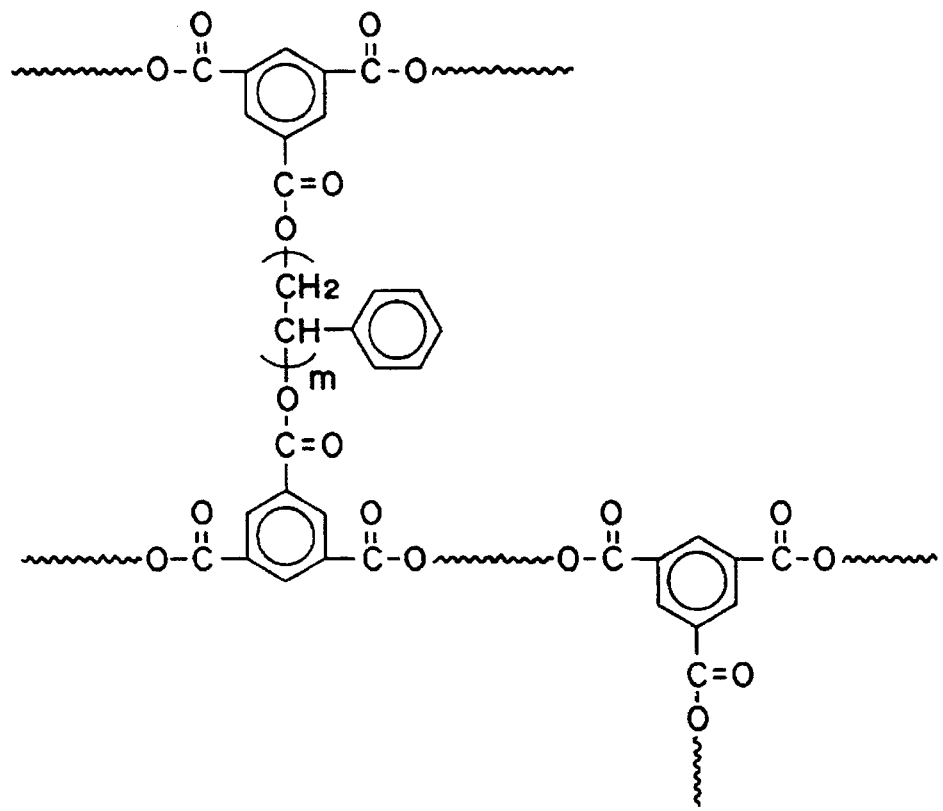
FIG. 3 is a chemical formula showing an example of a recyclable polymer having a network structure.

An example of the recyclable polymer having a network structure is shown in FIG. 3. In the example of FIG. 3, the oligomer unit shown by a wavy line is composed of an oligomer which is a polymer of styrene, and the linkage unit is formed by linking trimellitic acid to the oligomer via an ester bond. As shown in FIG. 3, trimellitic acid as the linkage unit is linked to three oligomers to form a recyclable polymer having a network structure as a whole.

The second aspect of the present invention provides a process for producing a recyclable polymer set forth in the first aspect by conducting one of the following steps:

(1)
 (a) forming oligomer units by polymerizing a fixed number of monomers, and
 (b) bonding linkage units to terminals of said oligomer units;

(2)
 (a) bonding linkage units to a monomer, and
 (b) forming oligomer units by polymerizing a fixed number of monomers including said monomer at a terminal thereof;

(3)
(a) forming oligomer units by polymerizing a fixed number of monomers,
(b) bonding terminals of said oligomer units to precursors of linkage units, and
(c) completing the formation of said linkage units; and (4)
(a) bonding a monomer to a precursor of a linkage unit, and
(b) forming oligomer units by polymerizing a fixed number of monomers including said monomer at a terminal thereof and completing the formation of said linkage units.

Thus, the process for producing the recyclable polymer in the second aspect of the invention can produce the recyclable polymer in the first aspect by forming oligomer units, bonding linkage units to the oligomer units or the monomer which will be constitute an oligomer unit, and if required, completing the formation of the oligomer units and the linkage units.

In the step of forming oligomer units, the oligomer units to constitute the recyclable polymer having a predetermined degree of polymerization are formed by polymerization of monomers. It is often advisable that the oligomer units have a functional group or functional groups for forming a chemical bond to the linkage unit at one terminal or both terminals thereof.

An advantageous embodiment of the step of forming oligomers is living polymerization. Living polymerization, as is well known, makes it possible to obtain a polymer having the following characteristics by using a specific polymerization initiator under specific polymerization conditions:

i) A polymer having a narrow molecular weight distribution, i.e., a uniform degree of polymerization is obtained.

ii) The molecular weight of the polymer can optionally be controlled over a wide range from an oligomer having a low molecular weight of less than hundreds to a polymer having a high molecular weight of more than hundreds of thousands.

iii) A functional group or functional groups for forming a chemical bond to a linkage unit can easily be introduced into one terminal or both terminals of the polymer.

Living polymerization includes, as is well known, living cationic polymerization, living anionic polymerization, living radical polymerization and living coordination polymerization (living Ziegler-Natta polymerization or living metathesis polymerization), any of which will do.

Another embodiment of the step of forming oligomers is a step using a radical polymerization initiator. In this step, radical polymerization of monomers is conducted using a radical polymerization initiator having a functional group capable of forming a bond to the linkage unit, and the thus-formed radicals are reacted to form an oligomer unit having the above functional groups at both terminals.

Still another embodiment of the step of forming oligomers is telomerization using a chain-transfer agent. In telomerization, polymerization is performed using a telogen X—Y and an n number of monomers (nM) to form a telechelic oligomer (X—Mn—Y).

When the step using the radical polymerization initiator and the telomerization using the chain transfer agent are employed in combination, an intended oligomer can be formed in a better yield. For example, when radical polymerization of monomers such as styrene is conducted using 4,4-azobis-4-cyanovaleric acid shown in FIG. 5 as a radical polymerization initiator and dithioglycolic acid shown in FIG. 6 as a chain-transfer agent, oligostyrene having carboxyl groups at both terminals can be formed.

Yet another embodiment of the step of forming oligomers is a step using polycondensation or polyaddition. In this step, a specific functional group capable of forming bonding to a linkage unit can be given to the terminal of the oligomer unit by using an excessive amount of one of the two monomers. For example, when a polyimide-type oligomer unit is formed by the polycondensation of a diamine monomer and an acid anhydride monomer as shown in FIG. 7, amino groups can be introduced into both terminals of the oligomer unit by adding an excessive amount of diamine monomers.

In the step of bonding linkage units, the terminal of an oligomer unit is bonded to a linkage unit. In this step, the oligomer unit has not necessarily been completed yet. After the monomer to constitute the terminal of the oligomer unit is bonded to the linkage unit, the formation of the oligomer unit may be started from the monomer. Moreover, the linkage unit has not necessarily been completed yet. After the precursor of the linkage unit is bonded to the oligomer unit, the linkage unit may be completed from the precursor in the step of completing the linkage units.

Figure 8:
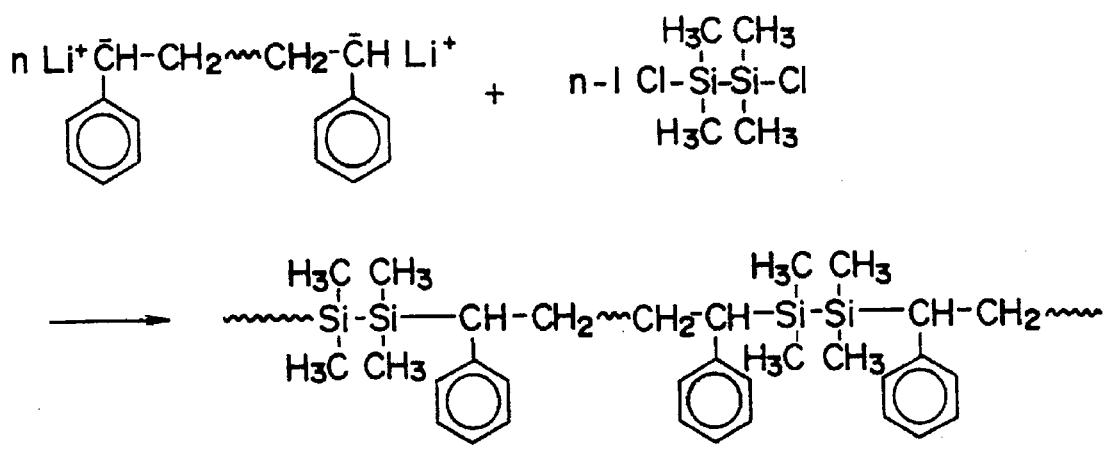
FIG. 8 is a scheme showing an example of the step of forming a linkage unit.

In an embodiment of the step of bonding linkage unit, the oligomer unit formed in the living anionic polymerization is reacted with tetramethyl dichlorodisilane Cl—Si(CH$_3$)$_2$—Si(CH$_3$)$_2$—Cl, thus obtaining a recyclable polymer such as the one shown in FIG. 8. In FIG. 8, wavy lines indicate a styrene oligomer unit having a fixed degree of polymerization.

The recyclable polymer can allow repetitive decomposition into oligomers and regeneration into the recyclable polymer by scission and re-bonding of the —Si—Si— bond at the linkage unit.

Figure 9:
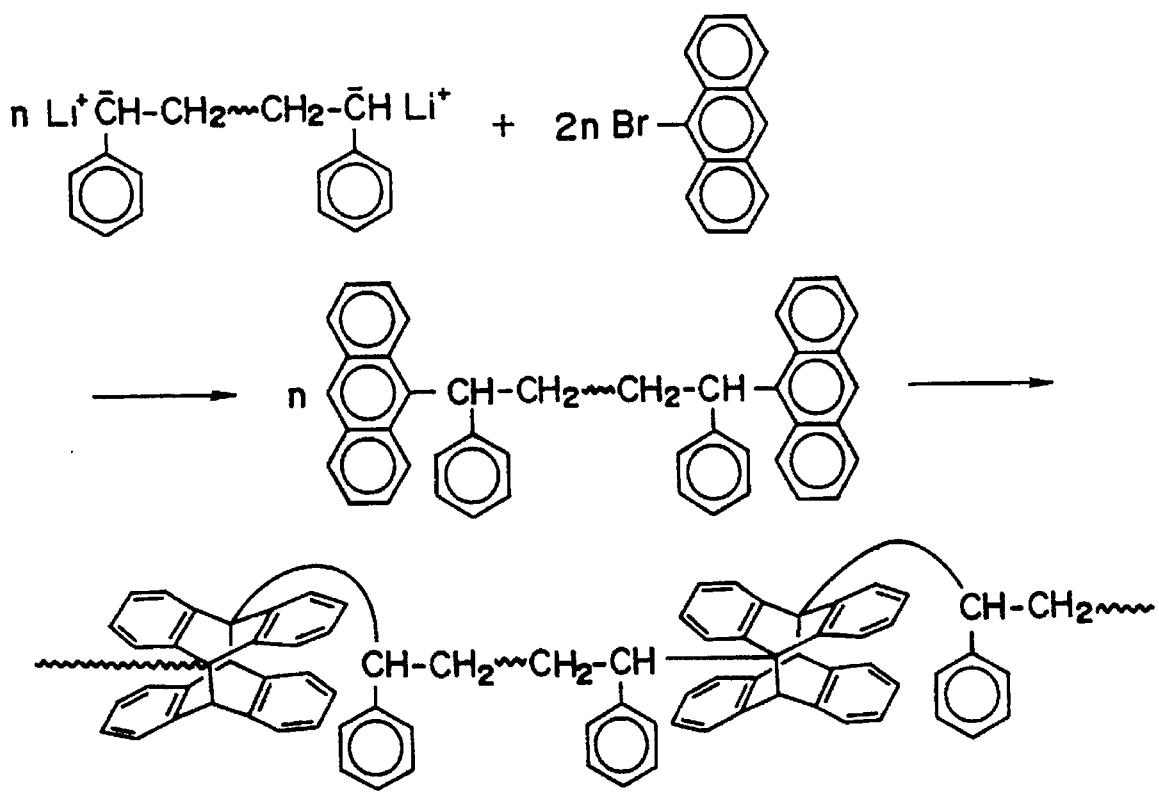
FIG. 9 is a scheme showing an example of the step of completing a linkage unit.

In an embodiment in which the step of completing the linkage unit is conducted subsequently to the step of bonding linkage units, as shown in, e.g., FIG. 9, both terminals of an oligomer unit formed by the living anionic polymerization are bonded to bromoanthracenes as precursors of linkage units to terminate the polymerization, and the bromoanthracenes are dimerized by photodimerization to complete the formation of the linkage units. In FIG. 9, wavy lines indicate an oligomer unit having a fixed degree of polymerization.

In another embodiment in which the step of completing the linkage unit is conducted subsequently to the step of bonding the linkage unit, oligomers are polymerized from a pair of polymerization initiators consisting of a living cationic polymerization initiator and a living anionic polymerization initiator having functional groups A and B respectively capable of being bonded to each other, and a carbocation at one polymerization terminal is bonded to a carbonanion at another polymerization terminal to form the oligomer unit. When a large number of these oligomers are bonded through bonds between the terminal functional groups A and B, the recyclable polymer is formed.

Figure 10:
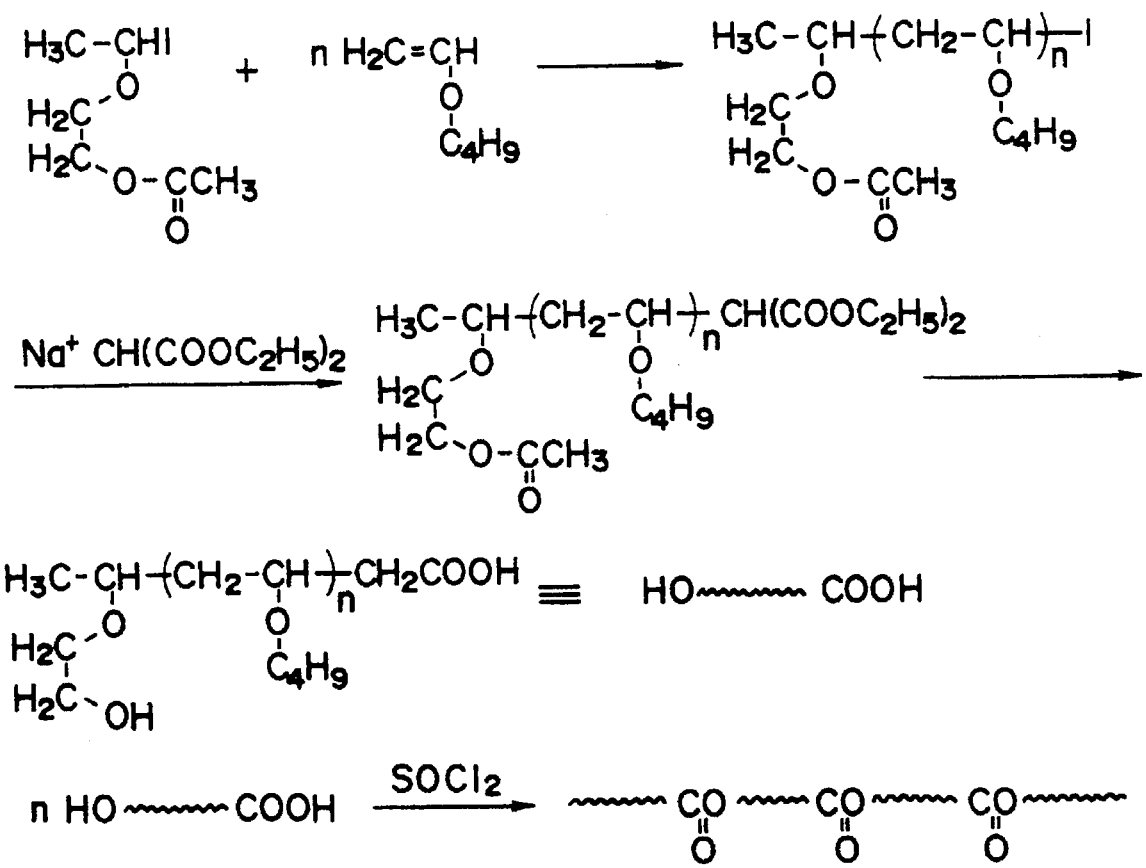
FIG. 10 is a scheme showing another example of the step of completing a linkage unit.

In still another part of the embodiment of the step of completing the linkage unit subsequently to the step of bonding linkage units, different precursors of the linkage units are bonded to both terminals of the oligomer. For example, as shown in FIG. 10, after an oligomer is formed by living cationic polymerization using an HI adduct of acetoxyvinyl ether as a polymerization initiator, the polymerization is terminated with sodium ethylmalate Na—CH (COOC$_2$H$_5$)$_2$, followed by hydrolysis. Then, an oligomer having a hydroxyl group at one terminal and a carboxyl group at another terminal is formed. When these oligomer units are linked to each other via an ester bond in the step of completing the formation of linkage units, a recyclable polymer is obtained. This recyclable polymer can be decomposed into oligomers units by hydrolysis of the ester bond.

In yet another part of the embodiment of the step of completing the linkage unit subsequently to the step of bonding the linkage unit, two kinds of oligomers are prepared, namely an oligomer having the same functional groups A at both terminals and an oligomer having the same functional groups B at both terminals (the functional groups A and B can be mutually linked or scissored) are prepared, and these oligomers are linked by the reaction between the functional groups A and B to afford a recyclable polymer. For example, an oligomer having hydroxyl groups at both terminals and an oligomer having carboxyl groups at both terminals are prepared, and these oligomers are linked to each other by an ester bond in the step of completing the formation of linkage units, thereby obtaining a recyclable polymer. This recyclable polymer can be decomposed into oligomers by the hydrolysis of the ester bond.

All of the aforesaid embodiments of the step of forming oligomer units, the step of bonding linkage units, and the step of completing the formation of linkage units can be applied to a case in which the oligomer unit is linearly formed, as well as a case in which the oligomer unit has a branched structure or a side chain structure with three or more terminals.

The third aspect of the present invention provides a method for recovering a recyclable polymer, which comprises subjecting commingled waste of polymeric materials containing a recyclable polymer as set forth in the first aspect to at least the following steps (5) and (6) to recover the intended recyclable polymer from the commingled waste of polymeric materials.

(5) forming oligomer units in which the recyclable polymer is decomposed into oligomers by conducting a predetermined treatment to scissor a chemical bond in the linkage units of the recyclable polymer, and (6) fractionating oligomer units obtained in the step of forming oligomer units by making use of the difference in fluidity or solubility in solvent of the oligomers from other polymeric materials.

The method for recovering the recyclable polymer in the third aspect of the invention makes it easy to fractionate the intended oligomer units from the commingled waste of polymeric materials by the step (4) of forming oligomer units and the step (5) of fractionating oligomer units. This method also facilitates fractionation of polymeric materials having poor solubility, such as a thermosetting resin, and fractionation of polymeric materials having close specific gravities.

In the step of forming oligomer units, a treatment to scissor the chemical bond in the linkage unit of the recyclable polymer is conducted to decompose the recyclable polymer into oligomers.

The treatment to scissor the chemical bond in the linkage unit includes various treatments depending on the kind of the chemical bond in the linkage unit, for example, the linking and scission treatment mentioned above in the section where the kind of the linkage unit is dealt with, and the linking and scission treatment mentioned above in the section where the step of bonding linkage units and the step of completing linkage units are dealt with. Generally speaking, the treatment may be selected suitably from among thermal decomposition, photodecomposition with deep UV light to visible light, hydrolysis, solvolysis with methanol, glycol and the like, and reversible reaction by oxidation-reduction or changing of wavelength of the radiation.

In the step of fractionating oligomer units, the oligomer obtained in the step of forming oligomer units is fractionated making use of the difference in fluidity or solubility in a solvent between the above oligomers and other polymeric materials.

That is, when the commingled waste of polymeric materials is subjected to the step of forming oligomer units, the recyclable polymer alone is usually made into oligomers having a low molecular weight. Consequently, first, since the oligomer is outstandingly improved in terms of its fluidity compared to the other polymeric materials of the commingled waste, the oligomer can be fractionated from the commingled waste of polymeric materials by filtration using a mesh sheet or decantation. Second, since the oligomer is improved in terms of its solubility in various solvents compared to the other polymeric materials of the commingled waste, the very oligomer alone can be fractionated from the commingled waste of polymeric materials by extracting it alone with a specific solvent.

The fourth aspect of this invention resides in a method for regenerating a recyclable polymer, which comprises separating and excluding an oligomer having a degraded or deteriorated chemical structure in its oligomer unit or linkage unit from the oligomers obtained in the step of fractionating oligomer units described in the third aspect by a predetermined treatment, and thereafter recombining oligomers except for the separated and excluded oligomers.

The method for regenerating the recyclable polymer in the fourth aspect makes it easy to separate and exclude degraded or deteriorated oligomers out of the oligomers obtained in the step of fractionating oligomer units in the third aspect. This method at least suppresses an energy loss and is economically advantageous compared to a conventional technique of decomposing a polymer into monomers for the regenerating the polymer.

The oligomers to be excluded in the fourth aspect includes an oligomer having a degraded or deteriorated structure of a main skeleton, and an oligomer which cannot be used in the regeneration of a recyclable polymer because of degradation or lack of a linkage unit or its precursor bonded to a terminal. These degraded or deteriorated oligomers are, compared to a normal oligomer, generally different in properties such as polarity, solubility, boiling point and viscosity. Accordingly, the degraded or deteriorated oligomers may be excluded by selecting a preferable method from among general fractionation methods such as vacuum distillation or atmospheric distillation, liquid chromatography including GPC, silica gel column chromatography and reprecipitation.

A method for regenerating a recyclable polymer from a purified oligomer obtained by excluding the degraded or deteriorated oligomer follows the order of the corresponding process in the second aspect.

EXAMPLES

Examples of the first to fourth aspects of this invention will be explained hereinafter.

Example 1

In this Example, oligomers were formed and then linked with the linkage unit to produce a recyclable polymer. Then, the recyclable polymer was decomposed into oligomers under such condition that the polymer was not commingled with other polymeric materials, and the oligomers were regenerated into the recyclable polymer again.

Four ml of tetrahydrofuran (THF) solution containing Na-naphthalene (0.2 mmol) as a polymerization initiator was introduced into a reactor connected to a vacuum line and held at −78° C. Further, while stirring the solution well, 40 ml of THF solution containing styrene (3.0 mmol) was gradually added, and the mixture was allowed to stand for 1 hour.

At this time, a part of the content in the reactor was taken out to another container. Methanol was added to the container to terminate the polymerization. Another large amount of methanol was charged into the container to precipitate and recover a styrene oligomer. The oligomer was obtained quantitatively, and its molecular weight was analyzed. As a result, a styrene oligomer was obtained having a molecular weight of approximately 3,000 which was nearly equal to a molecular weight theoretically found from a ratio of the monomer to the polymerization initiator. A molecular weight distribution of the styrene oligomer was 1.04, and the molecular weight was thus quite uniform.

On the other hand, 10 ml of a THF solution containing a disilane compound (0.2 mmol) of the formula Cl—(Me)$_2$Si—Si(Me)$_2$Cl was added to the rest of the content which was not taken out from the reactor, and was subjected to formation of a styrene recyclable polymer having a disilane linkage unit (—Si—Si—). Subsequently, this reaction solution was added dropwise to methanol, and the obtained precipitate of the styrene recyclable polymer was isolated and purified. The molecular weight of the polymer was measured. As a result, the overall weight average molecular weight was approximately 280,000. This polymer has a main skeleton in which styrene oligomers having a molecular weight of approximately 3,000 are linked through a disilane linkage unit.

The styrene recyclable polymer was measured for properties. As shown in "Example 1 (initial Product)" of Table 1, the properties of the recyclable polymer were all comparable to properties of polystyrene formed by usual radical polymerization (polymerization initiator AIBN, 110° C., 20 hours) having a molecular weight of approximately 290,000 (shown in "Comparative Example 1" of Table 1). In Table 1, a tensile strength and an elongation at break were measured according to JIS K6871, a flexural strength and a flexural modulus according to ASTM-D 790, and a heat distortion temperature according to JIS K6871, respectively. The measuring device was an Instron 4302 model universal testing machine. In the following Examples, the tensile strength, the elongation at break, the flexural strength, the flexural modulus, and the heat distortion temperature were measured using the same measuring methods using the same measuring device.

TABLE 1

|  | Example 1 (Initial Product) | Example 1 (Regenerated Product) | Example 2 (Initial Product) | Example 2 (Regenerated Product) | Comparative Example 1 |
| --- | --- | --- | --- | --- | --- |
| Tensile Strength (MPa) | 45 | 42 | 41 | 40 | 43 |
| Elongation at Break (%) | 1.0 | 1.0 | 2.2 | 2.0 | 1.7 |
| Flexural Strength (MPa) | 66 | 65 | 59 | 58 | 61 |
| Flexural Modulus (GPa) | 3.7 | 3.4 | 2.8 | 2.7 | 3.1 |
| Heat Distortion Temperature (°C.) | 89 | 88 | 81 | 77 | 84 |

Subsequently, the styrene recyclable polymer was dissolved in chloroform, and irradiated with deep UV light using a low-pressure mercury lamp as the light source under an inert atmosphere for 10 hours. The solvent was removed under vacuum, and a styrene oligomer having —Si—Cl bonds at both terminals was isolated. This styrene oligomer was obtained quantitatively, and had a molecular weight of approximately 2,900 and a molecular weight distribution of 1.08.

The styrene oligomer was dissolved in toluene, and condensed in the presence of sodium. Consequently, a styrene recyclable polymer having a molecular weight of approximately 260,000 was obtained in almost a fixed amount. The properties of this polymer were approximately the same as the properties of the initial product in Example 1, as shown in "Example 1 (Regenerated Product)" of Table 1.

Example 2

In this Example, two groups of oligomers were formed, and different precursors of the linkage units capable of reacting with each other were added to both terminals of the two groups of oligomers. Thereafter, the precursors of the linkage units of these oligomers were linked with each other to produce a recyclable polymer. Then, the recyclable polymer was decomposed into the oligomers on the condition that no other polymeric materials were commingled therewith. The oligomers were regenerated into a recyclable polymer, and such a regeneration was repeated several times to examine the change in the properties of the regenerated product.

First, a styrene oligomer was formed in two batches by the same procedure as used in Example 1. A THF solution of a styrene oligomer in one batch was taken out from the line, and added to a dry ice. Then, this solution was charged into a large amount of methanol acidified with hydrochloric acid to precipitate and recover the styrene oligomer. This styrene oligomer (hereinafter referred to as "oligomer A") had carboxyl groups (—COOH) given from the dry ice at both terminals, and had a molecular weight of approximately 3,000 and a molecular weight distribution of 1.06.

A THF solution of ethylene oxide was added to a line filled with a styrene oligomer in the other batch. The reaction solution was taken out from the line and added to a large amount of methanol acidified with hydrochloric acid to precipitate and recover the styrene oligomer. This styrene oligomer (hereinafter referred to as "styrene oligomer B") had hydroxyl groups (—OH) at both terminals, and had a molecular weight of approximately 3,000 and a molecular weight distribution of 1.05.

Oligomer A was reacted with SOCl$_2$ to introduce —COCl into both terminals, and the thus-obtained oligomer A was reacted with oligomer B to give a styrene recyclable polymer in which oligomer A was linked with oligomer B via an ester bond. A molecular weight of the polymer was approximately 250,000, and its properties were almost equal to those of polystyrene in Comparative Example 1, as shown in "Example 2 (Initial Product)" of Table 1.

Then, the styrene recyclable polymer in this Example was hydrolyzed in the presence of KOH to obtain a mixture of oligomers A and B. The oligomers constituting the mixture had a molecular weight of approximately 2,000 and a molecular weight distribution of 1.10.

The above oligomer mixture was reacted with $SOCl_2$ again to introduce —COCl into both terminals of oligomer A. The resulting oligomer A was reacted with oligomer B to regenerate a styrene recyclable polymer in which oligomer A was linked with oligomer B via an ester bond. The properties of the regenerated polymer were almost equal to those of the initial product in Example 1, as shown in "Example 2 (Regenerated Product)" of Table 1.

After the regenerated polymer was hydrolyzed by the same step as mentioned above, the second regeneration of the styrene recyclable polymer was carried out. The secondly regenerated product had such properties as a tensile strength of 40 MPa, an elongation at break of 1.8%, a flexural strength of 56 MPa, a flexural modulus of 2.7 GPa and a heat distortion temperature of 78° C.

Example 3

In this Example as well, two groups of oligomers were formed, and different precursors of linkage units capable of reacting with each other were added to both terminals of the two groups of oligomers. Thereafter, the precursors of the linkage units of these oligomers were linked with each other to produce a recyclable polymer. Then, the recyclable polymer was decomposed into the oligomers on the condition that other polymeric materials were not commingled therewith.

Figure 11:
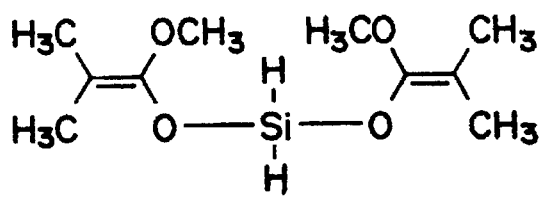
FIG. 11 is a chemical formula of a bifunctional polymerization initiator.

THF (225 ml), containing a compound of the type shown in FIG. 11 as a bifunctional polymerization initiator (1.16 mmol) and a suitable amount of n-Bu4NF·3H$_2$O as a catalyst were introduced into each of two flasks. Then, methyl methacrylate (MMA) was added dropwise up to 0.06 mol over a period of 1 hour. A reaction time of 10 hours was set as being sufficient to conduct the polymerization of the monomers.

Figure 12:
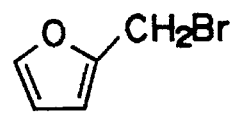
FIG. 12 is a chemical formula of a precursor of one linkage unit used a Example 3.

A compound of the type shown in FIG. 12 was added in an amount of 2.5 mmol to one of the thus-prepared polymerization batches having the same contents, and the solution was stirred for 1 hour. An MMA oligomer (hereinafter referred to as "oligomer C") was obtained having a molecular weight of approximately 5,200 and a molecular weight distribution of 1.12. Furan rings were quantitatively introduced into both terminals of oligomer C.

Figure 13:
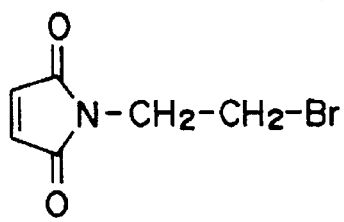
FIG. 13 is a chemical formula of a precursor of the other linkage unit used in Example 3.

A compound of the type shown in FIG. 13 was added in an amount of 2.5 mol to the other batch, and the solution was stirred for 1 hour to obtain an MMA oligomer (hereinafter referred to as "oligomer D") having a molecular weight of approximately 5,000 and a molecular weight distribution of 1.18. Maleimide rings were quantitatively introduced into both terminals of oligomer D.

The reaction solution containing the above oligomer C was mixed with the reaction solution containing the above oligomer D, and the mixture was stirred at room temperature for 20 hours to obtain an MMA polymer having a weight average molecular weight of approximately 510,000, in which a large number of MMA oligomers were linked via Diels-Alder reaction portions of furan rings and maleimide rings as linkage units.

This polymer was heated at 90° C. for 4 hours to cause it to decompose. Then, the viscosity was notably decreased, and an MMA oligomer having a molecular weight of approximately 5,100 and a molecular weight distribution of 1.23 was obtained almost quantitatively.

Example 4

In this Example, an oligomer was formed, and a functional group was added to one terminal thereof. Meanwhile, a core compound having at least three linkage units capable of being bonded to the above functional group was prepared. This core compound was linked with at least three oligomers to produce a so-called star polymer which was recyclable. This star polymer was once oligomerized, and the oligomer was then regenerated into a star polymer.

A container was placed into an autoclave which had been thoroughly purged with nitrogen, and was charged with 951 ml of toluene. This container was cooled to −78° C. with an ethanol solution into which dry ice was placed. Then, propylene in an amount of 830 mmol was dissolved in the toluene. Subsequently, 5 ml of a 1 mol/l toluene solution of diethylammonium chloride as a cocatalyst was added. Finally, vanadium acetyacetonate as a catalyst/polymerization initiator was added in an amount of 0.5 mmol to start the polymerization of propylene.

After a period of three hours from the start of the polymerization, a part of the polymerization solution was taken out, and added dropwise to methanol to precipitate and isolate a propylene oligomer. The propylene oligomer had a molecular weight of approximately 16,000 and a molecular weight distribution of 1.16.

In order to form an aldehyde group at one terminal of the propylene oligomer, 30 kg/cm$^2$ of carbon monoxide was first added to the rest of the polymerization solution after 3 hours, and they were further reacted for 1 hour while stirring. After that, the reaction solution was charged into an excess of an ethanol solution acidified with hydrochloric acid to precipitate a propylene oligomer. The precipitate was filtered and fractionated, then washed with methanol several times, and dried under vacuum. An aldehyde group was quantitatively formed at one terminal of the propylene oligomer as was confirmed by infrared absorption spectrum.

Then, the propylene oligomer having an aldehyde group at one terminal was treated with lithium aluminum hydride to convert the above aldehyde group into a hydroxyl group. The thus-obtained propylene oligomer having a hydroxyl group at one terminal was mixed with trimellitic acid chloride in an amount of approximately ⅓ equivalent of the propylene oligomer, to obtain star polypropylene having three chains in which the propylene oligomer was linked with trimellitic acid as the linkage unit by an ester bond.

Figure 14A:
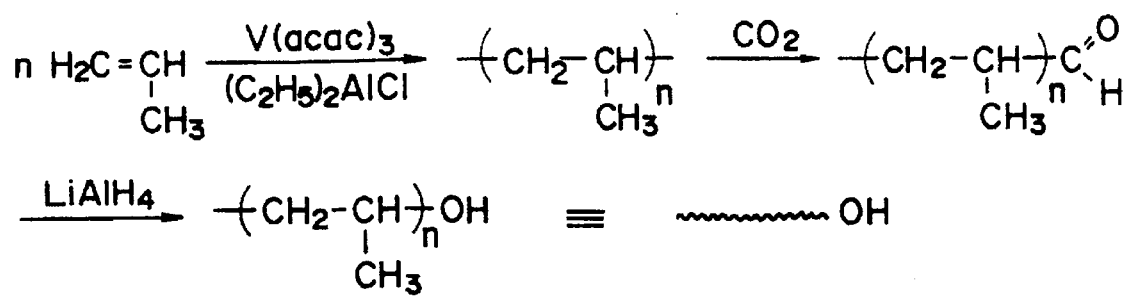
FIG. 14 is a scheme showing the process used in Example 4.
Figure 14B:
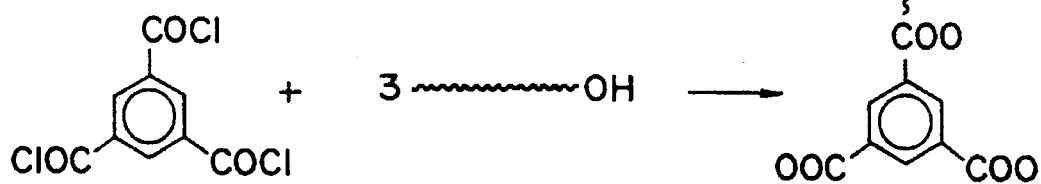
Figure 14C:
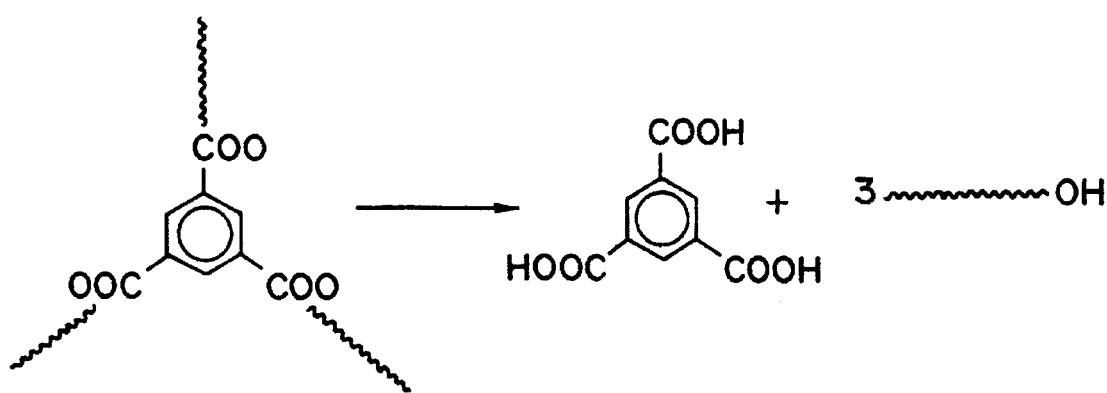

The above star polypropylene was hydrolyzed. As a result, a propylene oligomer having a molecular weight of approximately 16,000 and a molecular weight distribution of 1.20 was obtained again. The outline of the process of this Example is shown in FIG. 14, wherein the wavy line shows the oligomer unit.

Example 5

In this Example, this invention was applied to a thermosetting resin which is generally considered difficult to decompose. That is, two kinds of monomers as starting materials of the thermosetting resin were copolymerized to form an oligomer, and the oligomer was linked with a linkage unit to form a thermosetting recyclable polymer. After the recyclable polymer was once decomposed into oligomers, the oligomers were regenerated into the recycled polymer. In Comparative Example 1, the same oligomer was linked with a non-decomposable compound to obtain a thermosetting polymer, and it was confirmed whether the polymer was decomposed into an oligomer under the same conditions as used in Example 5.

A reaction vessel was charged with 342 g (1.5 mol) of bisphenol A as the first monomer and 1,388 g (15 mol) of epichlorohydrin as the second monomer, and the mixed solution was heat-refluxed at 119° C. while stirring. Then, while adding 304 g of a 40 wt. % aqueous sodium hydroxide solution dropwise to the mixed solution over a period of approximately 3 hours to copolymerize the first and second monomers, the temperature of the content was adjusted to between 99° and 119° C.

After the addition of the aqueous sodium hydroxide solution was completed, to purify the co-oligomer, excess epichlorohidrin was recovered under vacuum, and 1,000 ml of toluene was added thereto. The solution was washed three times with 1 liter of water to remove the salt formed and the remaining alkali. Then, the residue was heated to 170° C. under vacuum to remove toluene. Thus, 509 g of bisphenol diglycidyl ether oligomer was obtained (the oligomer of an epoxy resin). This oligomer was a viscous, pale yellow liquid made only of a compound having a molecular weight of approximately 380.

Subsequently, 15 g of $H_2N(CH_2)_3$—Si—Si—$(CH_2)_3NH_2$ was added to 100 g of the above epoxy resin. The mixture was defoamed under vacuum, and subsequently poured into a silicone rubber mold. The mixture was heated at 80° C. for 8 hours and then at 180° C. for 4 hours to obtain a cured epoxy resin in which a plurality of the epoxy resin oligomers were linked via the —Si—Si— bond.

The above-mentioned cured epoxy resin was irradiated with deep UV light using a low-pressure mercury lamp in a toluene/chloroform mixed solvent in an inert atmosphere for 20 hours. This treatment caused the cured epoxy resin to be photodecomposed at the —Si—Si— bond site. After the solvent was removed, a viscous liquid made only of an oligomer having a molecular weight of 550 was again obtained. The increase in the molecular weight of the oligomer was attributed to the addition of aminopropylsilane.

The oligomer solution obtained by the photo-decomposition was condensed in toluene in the presence of sodium. As a result, the same cured epoxy resin as mentioned above was regenerated. The cured epoxy resin (initial product) which was formed first and the regenerated cured epoxy resin were measured in terms of their flexural strength and flexural modulus according to ASTM-D790.

Consequently, the initial product had a flexural strength of 96 MPa and a flexural modulus of 2.0 GPa. The regenerated product had a flexural strength of 92 MPa and a flexural modulus of 2.1 GPa. From the results of the measurement, the properties of the regenerated product can be estimated to be almost equal to those of the original product.

Figure 15A:
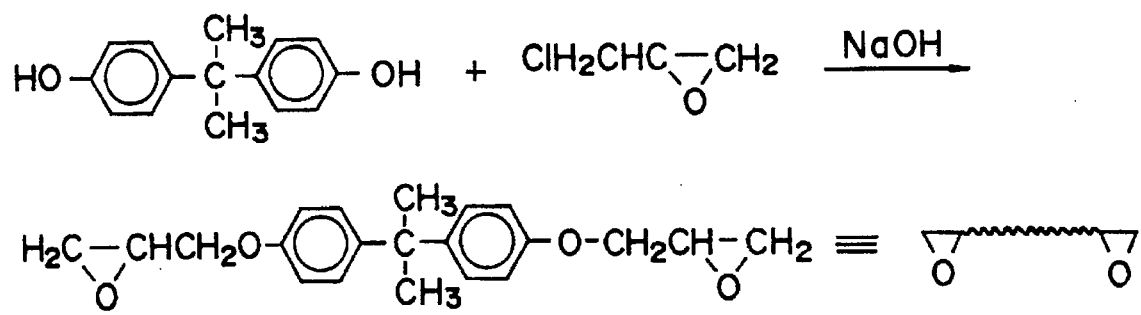
FIG. 15 is a scheme showing the process used in Example 5.
Figure 15B:
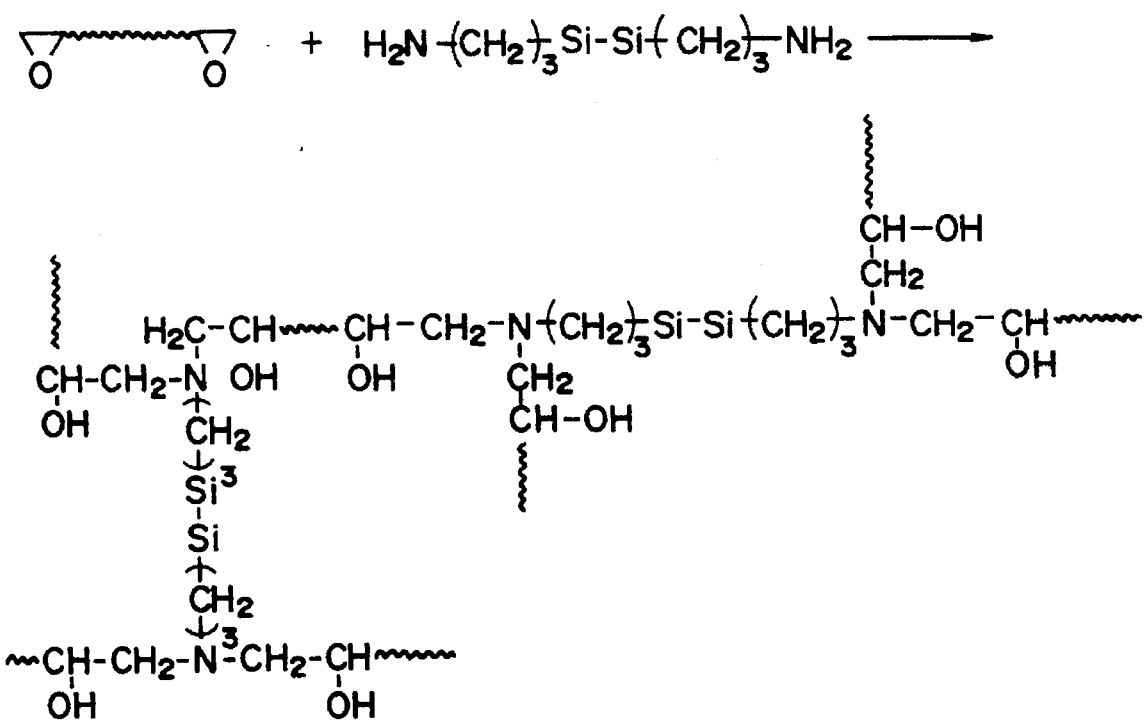

An outline of the process in this Example is shown in FIG. 15, wherein a wavy line indicates an oligomer unit.

Comparative Example 2

$H_2N(CH_2)SNH_2$ (15 g) was added to 100 g of an oligomer having a molecular weight of approximately 380 which was obtained in Example 5. The solution was defoamed under vacuum and then poured into a silicone rubber mold. The mixture was heated at 80° C. for 8 hours and then at 180° C. for 4 hours to obtain a cured epoxy resin in which a plurality of the oligomers of the epoxy resins were linked via —$(CH_2)_8$—.

The above-mentioned cured epoxy resin was irradiated with deep UV light using a low-pressure mercury lamp in a toluene/chloroform mixed solvent in an inert atmosphere for 20 hours. However, this treatment did not cause the cured epoxy resin to decompose, but it remained an insoluble, infusible cured resin.

Example 6

In this Example, a mixture of a recyclable polymer and other polymeric materials was subjected to an oligomerization step and an oligomer fractionation step to recover oligomers.

The same recyclable cured epoxy resin (the plurality of the oligomers of the epoxy resin were linked via —Si—Si— bonds) as used in Example 5, commercial polyethylene (weight average molecular weight of approximately 1,000,000) and commercial polypropylene (weight average molecular weight of approximately 200,000) were milled to a size of 1 to 10 mm, and then mixed at a weight ratio of 1:1:1 to artificially produce a waste mixture of the above three polymers.

The waste mixture of the polymeric materials was dipped in a toluene/chloroform mixed solvent in such a density that light was well transmitted therethrough, and was irradiated with deep UV light (254 nm) in an inert atmosphere for 20 hours. After the solid in the mixed solvent was filtered off, the solvent was evaporated with an evaporator to isolate the oligomer of the dissolved epoxy resin. The recovery rate of the oligomer of the epoxy resin was 92%, and the purity of the oligomer was confirmed to be 98% by GPC.

In comparison, a commingled waste of polymeric materials was produced in the same manner as in Example 5 except that the epoxy resin in Comparative Example 2 was used instead of the recyclable cured epoxy resin. The commingled waste was treated in the same manner as in Example 5 to make an attempt to recover the epoxy resin. However, none of the epoxy resin could be recovered.

Example 7

In this Example, a recyclable polymer was deteriorated, and the deteriorated polymer was decomposed into its oligomers. Upon removal of the degraded or deteriorated oligomer, a recyclable polymer was regenerated.

First, a powder of a styrene recyclable polymer was obtained in the same manner as in Example 2 except that the ratios of the polymerization initiator to the monomers were selected to make a weight average molecular weight of the polymer approximately 280,000 and a molecular weight of each oligomer unit constituting the polymer approximately 10,000. The styrene recyclable polymer was continuously irradiated with a light of 254 nm in air at 60° C. for 1 week to forcibly deteriorate said polymer.

Subsequently, the above-mentioned deteriorated polymer was hydrolyzed in the same manner as in Example 2, and then subjected to liquid chromatography (solvent: chloroform) manufactured by Shimadzu Corporation. The chemical structure of each fraction thus obtained was confirmed by NMR, thereby dividing the fractions into a deteriorated oligomer and an undeteriorated oligomer. The deteriorated oligomer occupied 17% by weight of all the recovered oligomers.

Using the above-mentioned undeteriorated oligomer, a styrene recyclable polymer was formed again. The regenerated product had such properties as a tensile strength of 42 MPa, an elongation at break of 2.2%, a flexural strength of 60 MPa, a flexural modulus of 3.0 GPa, and a heat distortion temperature of 85° C.

In comparison, a styrene recyclable polymer was formed using the oligomers without fractionating the deteriorated and undeteriorated oligomers. A regenerated product had such properties as a tensile strength of 10 MPa, an elongation at break of 6%, a flexural strength of 24 MPa, a flexural modulus of 0.8 GPa and a heat distortion temperature of 46° C.

What is claimed is:

1. A recyclable polymer comprising:

a plurality of oligomer units, formed of a fixed number of monomers, and linkage units which link at least two of said oligomer units through a chemical bond which is different from a bond between the monomers constituting the oligomer units, thereby allowing repetitive scission and re-bonding of the linkage units by a predetermined treatment capable of scissoring only the chemical bond in the linkage units, wherein at least one of said oligomer units is bonded to at least two of said linkage units.

2. The recyclable polymer according to claim 1 wherein said oligomer units are selected from the group consisting of oligomer units of polypropylene, polyethylene, polystyrene, polybutadiene, polyisoprene, polymethyl methacrylate, polyamide, polyurethane, polycarbonate, polyester, alkyd resin, epoxy resin and unsaturated polyester resin.

3. The recyclable polymer according to claim 1 wherein said oligomer units are oligomers obtained by copolymerizing at least two kinds of monomers.

4. The recyclable polymer according to claim 1 wherein said linkage unit has a —Si—Si— bond, a —C(=O)—O— bond or a —S—S— bond.

5. The recyclable polymer according to claim 1 wherein the linkage unit is formed by reaction of a furan and a maleimide; first and second coumarins; or first and second anthracenes.

6. The recyclable polymer according to claim 1 wherein the recyclable polymer is one selected from the group consisting of a linear polymer, a comb-shaped polymer with a main chain having side chains at regular intervals, a branched polymer and a cross-linked polymer with a three-dimensional network.

7. A recyclable polymer produced by a process which comprises (1) or (2):

(1)
(a) forming oligomer units by polymerizing a fixed number of monomers,
(b) bonding linkage units to terminals of said oligomer units, and
(c) linking said oligomer units; and (2)
(a) bonding linkage units to monomers, thereby forming monomer-linkage units,
(b) forming oligomer units by polymerizing a fixed number of monomers including said monomer-linkage units at terminals thereof, and
(c) linking said oligomer units;

wherein at least one of said oligomer units is bonded to at least two of said linkage units.

8. The recyclable polymer of claim 7 wherein said oligomer unit formed in said step (1)(a) or (2)(b) has a functional group or functional groups for combining with said linkage unit or linkage units at one terminal or both terminals thereof.

9. The recyclable polymer of claim 7 wherein said oligomer units are formed in said step (1)(a) or (2)(b) by cationic polymerization, anionic polymerization, radical polymerization or coordination polymerization.

10. The recyclable polymer of claim 7 wherein said oligomer units are formed in said step (1)(a) or (2)(b) by at least one method selected from the group consisting of telomerization using a chain-transfer agent, radical polymerization using a radical polymerization initiator, polycondensation and polyaddition.

11. The recyclable polymer of claim 7 wherein a —Si—Si— bond, a —C(=O)—O— bond or a —S—S— bond is formed at said linkage unit through said step (1)(b) or (2)(a).

12. A recyclable polymer produced by a process which comprises (1) or (2):

(1)
(a) forming oligomer units by polymerizing a fixed number of monomers,
(b) bonding terminals of said oligomer units to precursors of linkage units,
(c) completing the formation of said linkage units, and
(d) linking said oligomer units; and (2)
(a) bonding monomers to precursors of a linkage unit, thereby forming monomer-precursor units,
(b) forming oligomer units by polymerizing a fixed number of monomers including said monomer-precursor units at terminals thereof,
(c) completing the formation of said linkage units, and
(d) linking said oligomer units;

wherein at least one of said oligomer units is bonded to at least two of said linkage units.

13. The recyclable polymer of claim 12 wherein said oligomer unit formed in said step (1)(a) or (2)(b) has a functional group or functional groups for combining with said linkage unit or linkage units at one terminal or both terminals thereof.

14. The recyclable polymer of claim 12 wherein said oligomer units are formed in said step (1)(a) or (2)(b) by cationic polymerization, anionic polymerization, radical polymerization or coordination polymerization.

15. The recyclable polymer of claim 12 wherein said oligomer units are formed in said step (1)(a) or (2)(b) by at least one method selected from the group consisting of telomerization using a chain-transfer agent, radical polymerization using a radical polymerization initiator, polycondensation and polyaddition.

16. The recyclable polymer of claim 12 wherein a —Si—Si— bond, a —C(=O)—O— bond or a —S—S— bond is formed at said linkage unit through said step (1)(b) or (2)(a).

17. The recyclable polymer of claim 12 wherein said oligomer units are formed in said step (1)(a) or (2)(b) by anionic polymerization, said step (1)(b) or (2)(a) is conducted by bonding both terminals of said oligomer units or said monomer to bromoanthracenes as precursors of said linkage units and terminating the polymerization, and said linkage units are formed in said step (1)(c) or (2)(b) by dimerization of said bromoanthracenes through photodimerization.

18. The recyclable polymer of claim 12 wherein said oligomer units are formed in said step (1)(a) or (2)(b) using a cationic polymerization initiator having a first functional group and an anionic polymerization initiator having a second functional group capable of being linked to the first functional group at said terminals of the oligomer units, and then linking a carbocation of said first functional group to a carbanion of said second functional group, thereby linking said first functional group to said second functional group.

19. The recyclable polymer of claim 12 wherein said linkage units are formed in said step (1)(c) or (2)(b) by linking first functional groups at both terminals of one of said oligomer units to the second functional groups at both terminals of another oligomer unit.

20. The recyclable polymer of claim 1, wherein said recyclable polymer has a chain structure comprising said oligomer units alternately bonded to said linkage units.

21. The recyclable polymer of claim 1, wherein said oligomer units have a molecular weight of 500–10,000.

22. The recyclable polymer of claim 1, wherein said polymer is a thermosetting resin.

23. The recyclable polymer of claim 7, wherein the linkage unit is formed by reaction of a furan and a maleimide; first and second coumarins; or first and second anthracenes.

24. The recyclable polymer of claim 12, wherein the linkage unit is formed by reaction of a furan and a maleimide; first and second coumarins; or first and second anthracenes.

25. A process for producing a recyclable polymer which comprises (1) or (2):

(1)
  (a) forming oligomer units by polymerizing a fixed number of monomers,
  (b) bonding linkage units to terminals of said oligomer units, and
  (c) linking said oligomer units; and (2)
  (a) bonding linkage units to monomers, thereby forming monomer-linkage units,
  (b) forming oligomer units by polymerizing a fixed number of monomers including said monomer-linkage units at terminals thereof, and
  (c) linking said oligomer units;

wherein at least one of said oligomer units is bonded to at least two of said linkage units.

26. A process for producing a recyclable polymer which comprises (1) or (2):

(1)
  (a) forming oligomer units by polymerizing a fixed number of monomers,
  (b) bonding terminals of said oligomer units to precursors of linkage units,
  (c) completing the formation of said linkage units, and
  (d) linking said oligomer units; and (2)
  (a) bonding monomers to precursors of a linkage unit, thereby forming monomer-precursor units,
  (b) forming oligomer units by polymerizing a fixed number of monomers including said monomer-precursor units at terminals thereof,
  (c) completing the formation of said linkage units, and
  (d) linking said oligomer units;

wherein at least one of said oligomer units is bonded to at least two of said linkage units.

27. The process according to claim 25, wherein said oligomer unit formed in said step (1)(a) or (2)(b) has a functional group or functional groups for combining with said linkage unit or linkage units at one terminal or both terminals thereof.

28. The process according to claim 26, wherein said oligomer unit formed in said step (1)(a) or (2)(b) has a functional group or functional groups for combining with said linkage unit or linkage units at one terminal or both terminals thereof.

29. The process according to claim 25, wherein said oligomer units are formed in said step (1)(a) or (2)(b) by cationic polymerization, anionic polymerization, radical polymerization or coordination polymerization.

30. The process according to claim 26, wherein said oligomer units are formed in said step (1)(a) or (2)(b) by cationic polymerization, anionic polymerization, radical polymerization or coordination polymerization.

31. The process according to claim 25, wherein said oligomer units are formed in said step (1)(a) or (2)(b) by at least one method selected from the group consisting of telomerization using a chain-transfer agent, radical polymerization using a radical polymerization initiator, polycondensation and polyaddition.

32. The process according to claim 26, wherein said oligomer units are formed in said step (1)(a) or (2)(b) by at least one method selected from the group consisting of telomerization using a chain-transfer agent, radical polymerization using a radical polymerization initiator, polycondensation and polyaddition.

33. The process according to claim 25, wherein a —Si—Si— bond, a —C(=O)—O— bond or a —S—S— bond is formed at said linkage unit through said step (1)(b) or (2)(a).

34. The process according to claim 26, wherein a —Si—Si— bond, a —C(=O)—O— bond or a —S—S— bond is formed at said linkage unit through said step (1)(b) or (2)(a).

35. The process according to claim 26, wherein said oligomer units are formed in said step (1)(a) or (2)(b) by anionic polymerization, said step (1)(b) or (2)(a) is conducted by bonding both terminals of said oligomer units or said monomer to bromoanthracenes as precursors of said linkage units and terminating the polymerization, and said linkage units are formed in said step (1)(c) or (2)(b) by dimerization of said bromoanthracenes through photodimerization.

36. The process according to claim 26, wherein said oligomer units are formed in said step (1)(a) or (2)(b) using a cationic polymerization initiator having a first functional group and an anionic polymerization initiator having a second functional group capable of being linked to the first functional group at said terminals of the oligomer units, and then linking a carbocation of said first functional group to a carbanion of said second functional group, thereby linking said first functional group to said second functional group.

37. The process according to claim 26, wherein said linkage units are formed in said step (1)(c) or (2)(b) by linking first functional groups at both terminals of one of said oligomer units to the second functional groups at both terminals of another oligomer unit.

* * * * *